(12) United States Patent
Kasai et al.

(10) Patent No.: US 11,568,027 B2
(45) Date of Patent: Jan. 31, 2023

(54) LICENSE AUTHENTICATION DEVICE AND LICENSE AUTHENTICATION METHOD

(71) Applicant: Tokyo Electron Limited, Tokyo (JP)

(72) Inventors: Takahito Kasai, Iwate (JP); Youngtai Kang, Yamanashi (JP)

(73) Assignee: TOKYO ELECTRON LIMITED, Tokyo (JP)

( * ) Notice: Subject to any disclaimer, the term of this patent is extended or adjusted under 35 U.S.C. 154(b) by 168 days.

(21) Appl. No.: 16/884,141

(22) Filed: May 27, 2020

(65) Prior Publication Data

US 2020/0380095 A1 Dec. 3, 2020

(30) Foreign Application Priority Data

May 31, 2019 (JP) .............................. JP2019-103184

(51) Int. Cl.
*G06F 21/00* (2013.01)
*G06F 21/12* (2013.01)
(52) U.S. Cl.
CPC ...... *G06F 21/12* (2013.01); *G06F 2221/0775* (2013.01)
(58) Field of Classification Search
CPC .. G06F 21/05; G06F 21/12; G06F 2221/0775; G06F 21/105
See application file for complete search history.

(56) References Cited

U.S. PATENT DOCUMENTS

2008/0281625 A1\* 11/2008 Shiki ...................... G06F 21/10
726/19

FOREIGN PATENT DOCUMENTS

| JP | 2003-076435 | A | | 3/2003 | |
| JP | 2007-193579 | A | | 8/2007 | |
| JP | 2010232217 | | * | 10/2010 | ......... G03F 7/70525 |
| JP | 2011160383 | | * | 8/2011 | |
| JP | 2014-164392 | A | | 9/2014 | |
| TW | M523899 | U | | 6/2016 | |
| WO | 2006-016619 | A1 | | 2/2006 | |

\* cited by examiner

*Primary Examiner* — Joseph P Hirl
*Assistant Examiner* — Chi D Nguy
(74) *Attorney, Agent, or Firm* — Venjuris, P.C.

(57) ABSTRACT

A license authentication device includes a memory that stores a license file including a license expiration date of an application that adjusts a parameter of a semiconductor manufacturing apparatus in a semiconductor factory; and a processor coupled to the memory. The processor acquires log data when the semiconductor manufacturing apparatus executes a processing; and determines whether or not a time included in the log data has passed the license expiration date stored in the license information storage.

17 Claims, 4 Drawing Sheets

LICENSE AUTHENTICATION DEVICE AND LICENSE AUTHENTICATION METHOD

CROSS-REFERENCE TO RELATED APPLICATIONS

This application is based on and claims priority from Japanese Patent Application No. 2019-103184, filed on May 31, 2019 with the Japan Patent Office, the disclosure of which is incorporated herein in its entirety by reference.

TECHNICAL FIELD

The present disclosure relates to a license authentication device and a license authentication method.

BACKGROUND

A substrate processing apparatus capable of appropriately preventing unauthorized use of software operating in the substrate processing apparatus has been known (see, e.g., Japanese Patent Laid-Open Publication Nos. 2007-193579 and 2003-076435).

SUMMARY

A license authentication device according to one aspect of the present disclosure performs authentication of a license expiration date of an application that adjusts a parameter of a semiconductor manufacturing apparatus in a semiconductor factory, and includes a license information storage configured to store a license file including the license expiration date, a log data acquisition unit configured to acquire log data when the semiconductor manufacturing apparatus executes a processing, and a license expiration date determination unit configured to determine whether or not a time included in the log data acquired by the log data acquisition unit has passed the license expiration date stored in the license information storage.

The foregoing summary is illustrative only and is not intended to be in any way limiting. In addition to the illustrative aspects, embodiments, and features described above, further aspects, embodiments, and features will become apparent by reference to the drawings and the following detailed description.

DESCRIPTION OF EMBODIMENT

Figure 1:
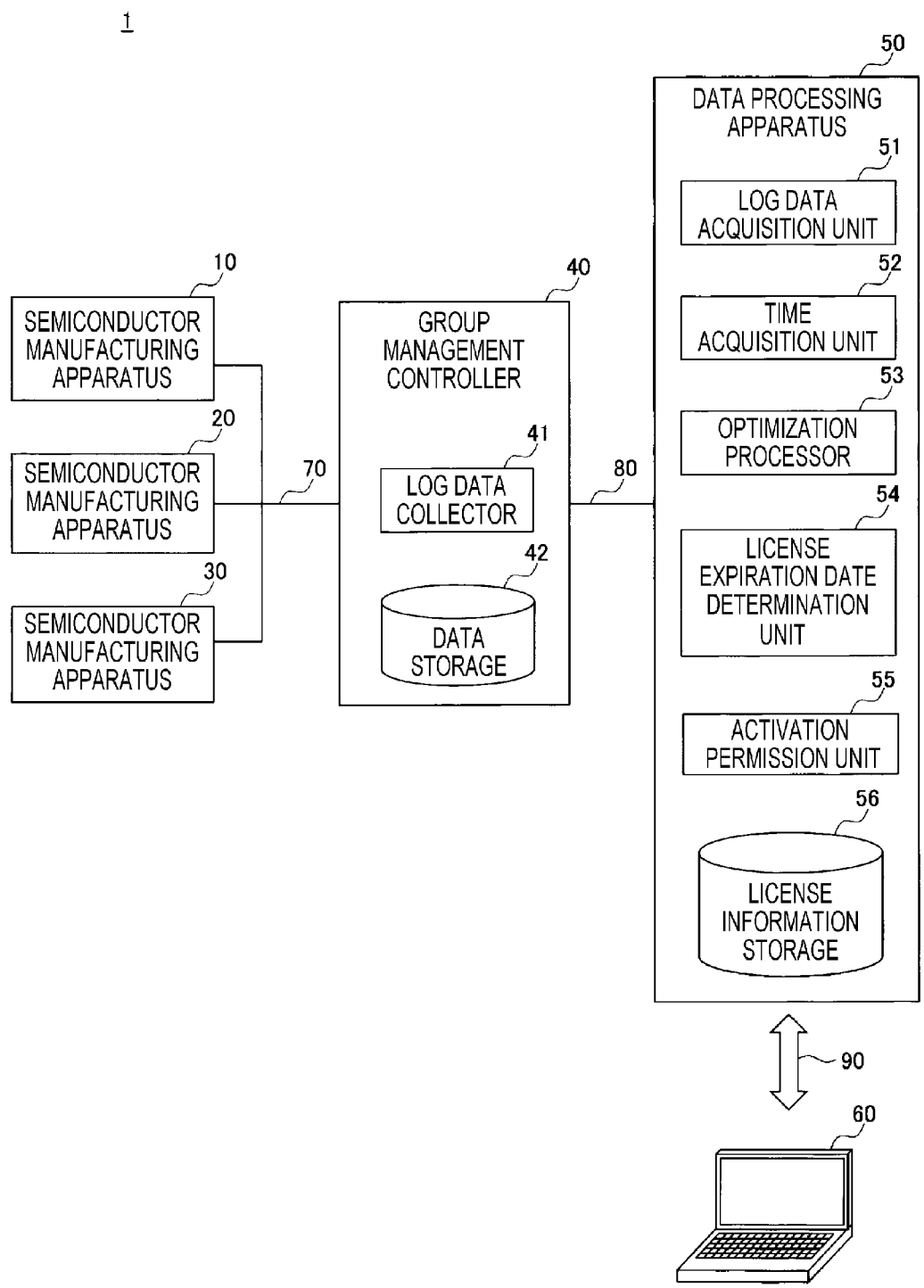
FIG. 1 is a diagram illustrating an example of an overall configuration of a system including a semiconductor manufacturing apparatus.

In the following detailed description, reference is made to the accompanying drawing, which form a part hereof. The illustrative embodiments described in the detailed description, drawing, and claims are not meant to be limiting. Other embodiments may be utilized, and other changes may be made without departing from the spirit or scope of the subject matter presented here.

Hereinafter, non-limiting exemplary embodiments of the present disclosure will be described with reference to the accompanying drawings. The same or corresponding reference numerals will be given to the same or corresponding members or parts throughout the accompanying drawings, and a redundant description will be omitted.

[Overall Configuration of System Including Semiconductor Manufacturing Apparatus]

An overall configuration of a system including a semiconductor manufacturing apparatus will be described with reference to FIG. 1. FIG. 1 is a diagram illustrating an example of an overall configuration of a system including a semiconductor manufacturing apparatus.

The system 1 includes semiconductor manufacturing apparatuses 10, 20 and 30, a group management controller 40, a data processing apparatus 50, and a terminal 60. The semiconductor manufacturing apparatuses 10, 20 and 30 are communicably connected to the group management controller 40 via a communication line 70 of a semiconductor factory. The group management controller 40 is communicably connected to the data processing apparatus 50 via a communication line 80 of the semiconductor factory. The data processing apparatus 50 is communicably connected to the terminal 60 via a communication line 90 of the semiconductor factory. The communication lines 70, 80 and 90 are separated from, for example, an external network. However, the communication lines 70, 80 and 90 may be communicably connected to the external network.

The semiconductor manufacturing apparatuses 10, 20 and 30 may be communicably connected to a host computer (not illustrated) via a communication line of the semiconductor factory. The host computer may be communicably connected to a device other than the semiconductor manufacturing apparatuses 10, 20, and 30 in the semiconductor factory, for example, an inspection device that inspects semiconductors manufactured by the semiconductor manufacturing apparatuses 10, 20 and 30 via a communication line of the semiconductor factory. The inspection device includes, for example, a film thickness measurement device, an electrical characteristic measurement device, and an optical characteristic measurement device.

[Semiconductor Manufacturing Apparatus]

The semiconductor manufacturing apparatuses 10, 20 and 30 are apparatuses that perform various semiconductor manufacturing processes. The semiconductor manufacturing processes include various processings for manufacturing semiconductors such as, for example, a film forming processing, an etching processing, and a thermal processing. The semiconductor manufacturing apparatuses 10, 20 and 30 may be, for example, a cluster type apparatus configured by arranging a plurality of processing chambers around a transfer chamber, or an in-line type apparatus configured by arranging one processing chamber at one transfer chamber. Further, the semiconductor manufacturing apparatuses 10, 20 and 30 may be, for example, any of a single wafer type apparatus, a semi-batch type apparatus, and a batch type apparatus. The single wafer type apparatus is, for example, an apparatus that processes wafers one by one in a processing chamber. The semi-batch type apparatus is, for example, an apparatus that revolves a plurality of wafers arranged on a rotary table in a processing chamber by the rotary table and forms a film on the surfaces of the wafers by sequentially passing the wafers through a region to which a raw material gas is supplied and a region to which a reaction gas reacting with the raw material gas is supplied. The batch type apparatus is, for example, an apparatus that accommodates, in a processing chamber, a wafer boat in which a plurality of wafers is horizontally held at a predetermined interval in a height direction and performs a processing on the wafers at a time. Further, FIG. 1 illustrates three semiconductor manufacturing apparatuses 10, 20 and 30, but the number of semiconductor manufacturing apparatuses is not particularly limited.

[Group Management Controller]

The group management controller 40 acquires log data when the semiconductor manufacturing apparatuses 10, 20 and 30 executes a processing, and stores the acquired log data.

Figure 2:
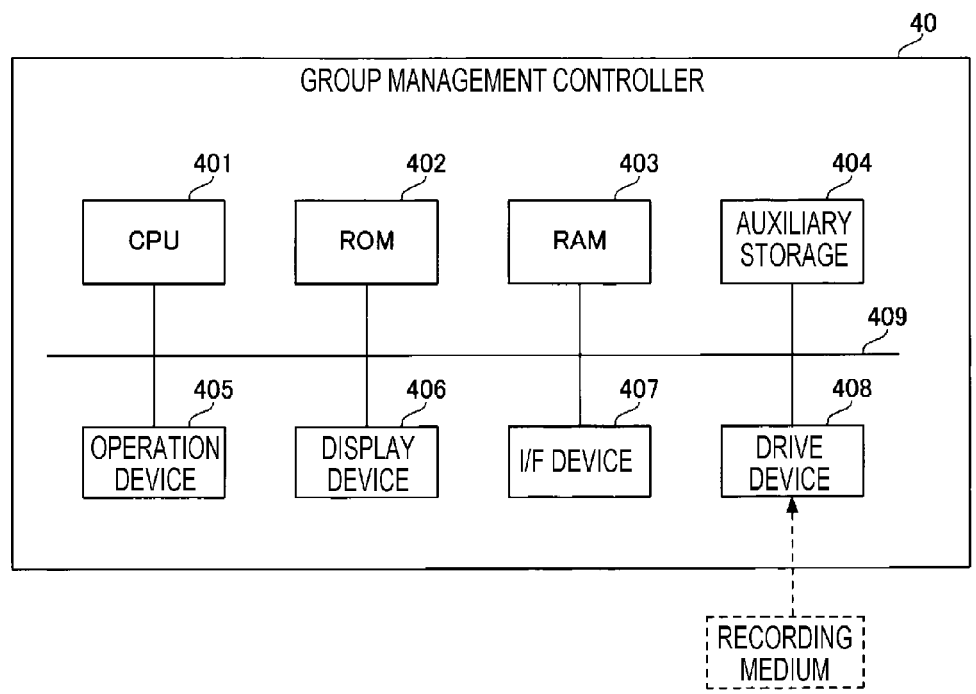
FIG. 2 is a diagram illustrating an example of a hardware configuration of a group management controller.

First, a hardware configuration of the group management controller 40 will be described with reference to FIG. 2. FIG. 2 is a diagram illustrating an example of a hardware configuration of the group management controller 40.

The group management controller 40 has a central processing unit (CPU) 401, a read only memory (ROM) 402, and a random access memory (RAM) 403. The CPU 401, the ROM 402, and the RAM 403 form a so-called computer. Further, the group management controller 40 includes an auxiliary storage device 404, an operation device 405, a display device 406, an interface (I/F) device 407, and a drive device 408. The respective hardware components of the group management controller 40 are mutually connected via a bus 409.

The CPU 401 executes various programs installed in the auxiliary storage device 404.

The ROM 402 is a non-volatile memory, and functions as a main storage device. The ROM 402 stores, for example, various programs and data necessary for the CPU 401 to execute the various programs installed in the auxiliary storage device 404.

The RAM 403 is a volatile memory such as, for example, a dynamic random access memory (DRAM) or a static random access memory (SRAM), and functions as a main storage device. The RAM 403 provides a work area that is developed when the various programs installed in the auxiliary storage device 404 are executed by the CPU 401.

The auxiliary storage device 404 stores various programs or log data of the semiconductor manufacturing apparatuses 10, 20 and 30 acquired by executing the various programs by the CPU 401.

The operation device 405 is an input device used when a manager inputs various instructions to the group management controller 40. The display device 406 is a display device that displays internal information of the group management controller 40.

The I/F device 407 is a connection device that connects to the communication lines 70 and 80 to communicate with the semiconductor manufacturing apparatuses 10, 20 and 30 and the data processing apparatus 50.

The drive device 408 is a device for setting a recording medium. The recording medium includes a medium that optically, electrically, or magnetically records information such as, for example, a CD-ROM, a flexible disk, or a magneto-optical disk. Further, the recording medium may include, for example, a semiconductor memory that electrically records information, such as, for example, a ROM or a flash memory.

Various programs to be installed in the auxiliary storage device 404 are installed, for example, by setting a distributed recording medium in the drive device 408 and reading out various programs recorded on the recording medium by the drive device 408.

Next, a functional configuration of the group management controller 40 will be described with reference to FIG. 1

The group management controller 40 has a log data collector 41 and a data storage 42.

The log data collector 41 collects log data when the semiconductor manufacturing apparatuses 10, 20 and 30 execute a semiconductor manufacturing process, and stores the log data in the data storage 42. The log data is data indicating the states of the semiconductor manufacturing apparatuses 10, 20 and 30 when the semiconductor manufacturing apparatuses 10, 20 and 30 execute the semiconductor manufacturing process. For example, the log data is stored in the data storage 42 as one file for each predetermined run (processing). The log data is information obtained by detecting, for example, a substrate temperature, a processing pressure, and a gas flow rate at predetermined time intervals, and includes information on the time at which the semiconductor manufacturing apparatuses 10, 20 and 30 started the semiconductor manufacturing process.

The data storage 42 stores the log data collected by the log data collector 41.

[Data Processing Apparatus]

The data processing apparatus 50 functions as an application execution device that executes an application that adjusts parameters of the semiconductor manufacturing apparatuses 10, 20 and 30, and also functions as a license authentication device that performs authentication of a license expiration date of the application.

Figure 3:
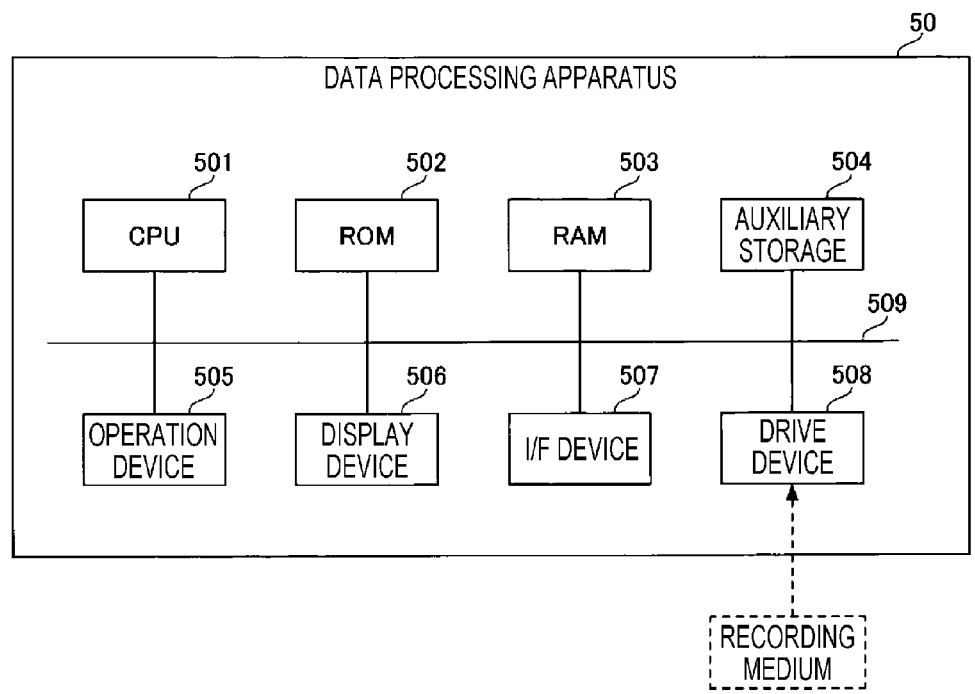
FIG. 3 is a diagram illustrating an example of a hardware configuration of a data processing apparatus.

First, a hardware configuration of the data processing apparatus 50 will be described with reference to FIG. 3. FIG. 3 is a diagram illustrating an example of a hardware configuration of the data processing apparatus 50.

The data processing apparatus 50 includes a central processing unit (CPU) 501, a read only memory (ROM) 502, and a random access memory (RAM) 503. The CPU 501, the ROM 502, and the RAM 503 form a so-called computer. Further, the data processing apparatus 50 includes an auxiliary storage device 504, an operation device 505, a display device 506, an interface (I/F) device 507, and a drive device 508. The respective hardware components of the data processing apparatus 50 are mutually connected via a bus 509.

The CPU 501 executes various programs installed in the auxiliary storage device 504.

The ROM 502 is a non-volatile memory, and functions as a main storage device. The ROM 502 stores, for example, various programs and data necessary for the CPU 501 to execute the various programs installed in the auxiliary storage device 504.

The RAM 503 is a volatile memory such as, for example, a dynamic random access memory (DRAM) or a static random access memory (SRAM), and functions as a main storage device. The RAM 503 provides a work area that is developed when the various programs installed in the auxiliary storage device 504 are executed by the CPU 501.

The auxiliary storage device 504 stores various programs. The various programs include an application that adjusts parameters of the semiconductor manufacturing apparatuses 10, 20 and 30. Further, the auxiliary storage device 504 stores a license file of the application. The license file includes, for example, a license expiration date, license PC information, and license apparatus information. The license expiration date is the expiration date of a license. The license PC information is information on a computer in which an application as a license target is to be used. The license apparatus information is information on a semiconductor manufacturing apparatus in which an application as a license target is to be used.

The operation device 505 is an input device used when the manager inputs various instructions to the data processing apparatus 50. The display device 506 is a display device that displays internal information of the data processing apparatus 50.

The I/F device 507 is a connection device that connects to the communication lines 80 and 90 to communicate with the group management controller 40 and the terminal 60.

The drive device 508 is a device for setting a recording medium. The recording medium includes a medium that optically, electrically, or magnetically records information, such as, for example, a CD-ROM, a flexible disk, or a magneto-optical disk. Further, the recording medium may include, for example, a semiconductor memory that electrically records information, such as, for example, a ROM or a flash memory.

Various programs to be installed in the auxiliary storage device 504 are installed, for example, by setting a distributed recording medium in the drive device 508 and reading out various programs recorded on the recording medium by the drive device 508.

Next, a functional configuration of the data processing apparatus 50 will be described with reference to FIG. 1

The data processing apparatus 50 includes a log data acquisition unit 51, a time acquisition unit 52, an optimization processor 53, a license expiration date determination unit 54, an activation permission unit 55, and a license information storage 56.

The log data acquisition unit 51 acquires log data collected by the group management controller 40 when the semiconductor manufacturing apparatuses 10, 20 and 30 execute a semiconductor manufacturing process.

The time acquisition unit 52 acquires information on various times. The information on various times may be, for example, the time of a device connected to a communication line of the semiconductor factory. The device is, for example, at least one of the semiconductor manufacturing apparatuses 10, 20 and 30, the group management controller 40, the host computer, and the inspection device. Further, the information on various times may be, for example, the time of the data processing apparatus 50. The time of the data processing apparatus 50 may be, for example, the current time of the data processing apparatus 50, or may be the time at which the data processing apparatus 50 starts to execute the above-described application.

The optimization processor 53 executes an optimization processing of calculating processing conditions of an optimum semiconductor manufacturing process, by which desired characteristics may be obtained, based on the log data acquired by the log data acquisition unit 51.

The license expiration date determination unit 54 determines whether or not the time included in the log data acquired by the log data acquisition unit 51 has passed the license expiration date included in a license file stored in the license information storage 56. The time included in the log data may be, for example, the time (run start time) at which the semiconductor manufacturing apparatuses 10, 20 and 30 started a predetermined processing (run).

The activation permission unit 55 permits the optimization processor 53 to execute an optimization processing when the license expiration date determination unit 54 determines that the license expiration date has not passed. On the other hand, the activation permission unit 55 does not permit the optimization processor 53 to execute the optimization processing when the license expiration date determination unit 54 determines that the license expiration date has passed.

The license information storage 56 stores a license file. The license file includes, for example, a license expiration date, license PC information, and license apparatus information.

[Operation of Data Processing Apparatus]

Figure 4:
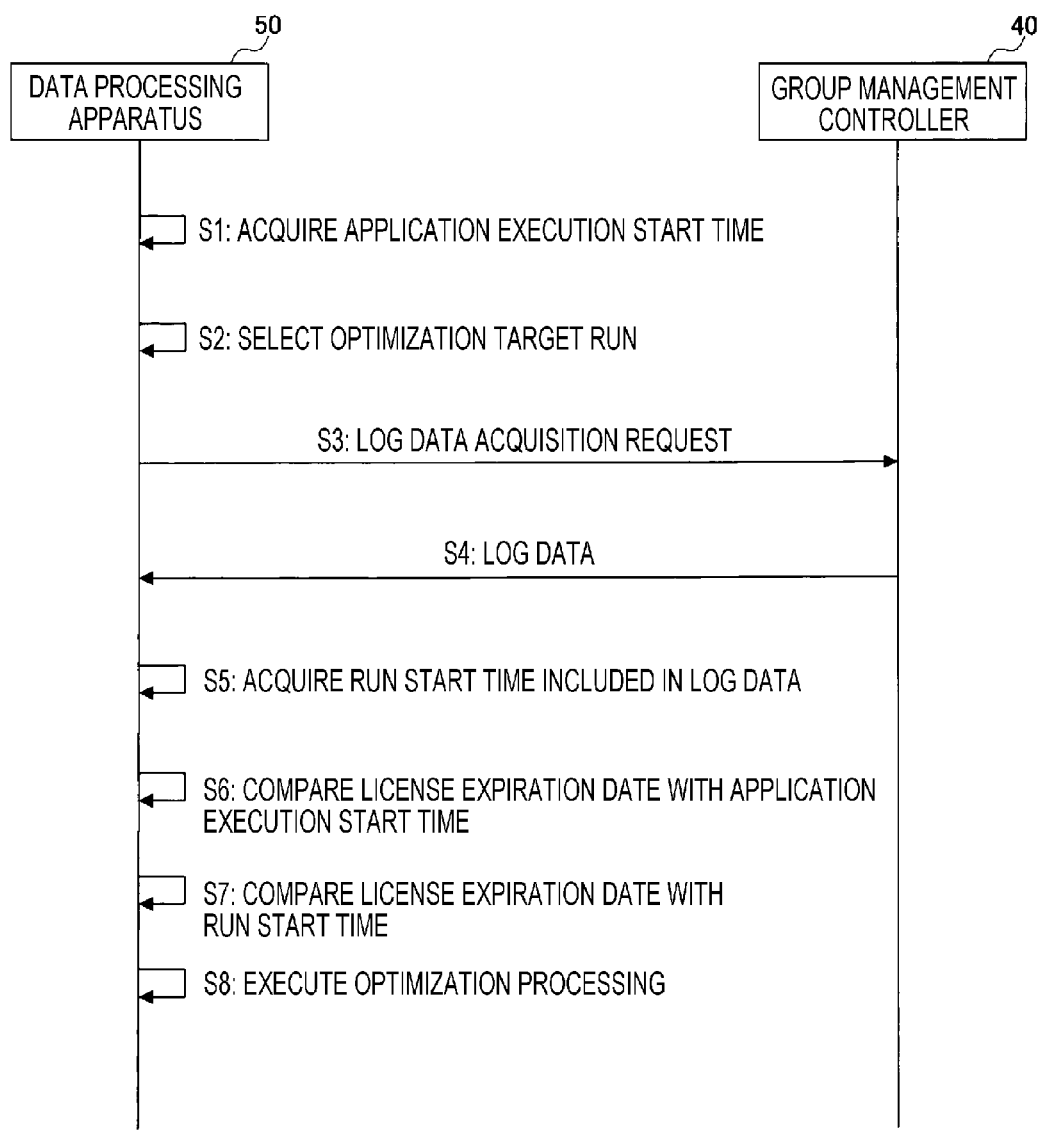
FIG. 4 is a sequence diagram illustrating an example of an operation of the data processing apparatus.

An operation (license authentication method) of the data processing apparatus 50 will be described with reference to FIG. 4. FIG. 4 is a sequence diagram illustrating an example of an operation of the data processing apparatus 50. Hereinafter, a case where a parameter optimization processing for the semiconductor manufacturing apparatus 10 is executed by an operator will be described, but this is equally applied to the other semiconductor manufacturing apparatuses 20 and 30.

First, when the operator performs an operation of executing an application that optimizes parameters of a semiconductor manufacturing apparatus, the data processing apparatus 50 acquires the time at which the operation of executing the application was performed (application execution start time) (step S1). The operator may perform an operation of instructing the execution of the application that optimizes the parameters of the semiconductor manufacturing apparatus via the terminal 60. In this case, the terminal 60 that has received the operation of instructing the execution of the application transmits information indicating that the operation has been received to the data processing apparatus 50. The data processing apparatus 50 that has received the information acquires at least one of the time at which the terminal 60 received the instruction to execute the application and the time at which the data processing apparatus 50 received the information from the terminal 60. Further, in step S1, the data processing apparatus 50 compares the data processing apparatus name of the data processing apparatus 50 with the license PC information included in the license file stored in the license information storage 56. When the two do not match, the comparison result is error, and the data processing apparatus 50 ends the processing without permitting the execution of the optimization processing.

Subsequently, when the operator performs selection of the semiconductor manufacturing apparatus and a run whose parameters are to be optimized (step S2), the data processing apparatus 50 transmits an acquisition request for log data of the selected semiconductor manufacturing apparatus and the selected run to the group management controller 40 (step S3). At this time, the data processing apparatus 50 compares the device name of the semiconductor manufacturing apparatus selected in step S2 with a license apparatus included in the license file stored in the license information storage 56. When the two do not match, the comparison result is an error, and the data processing apparatus 50 ends the processing without transmitting the log data acquisition request to the group management controller 40. Further, the comparison of the license apparatus included in the license file may use log data acquired in step S4 to be described below. In this case, the comparison of the license apparatus may be performed at any timing from step S4 to step S8.

When the group management controller 40 receives the log data acquisition request from the data processing apparatus 50, the group management controller 40 transmits, to the data processing apparatus 50, the log data of the semiconductor manufacturing apparatus and the run which have been requested to be acquired (step S4). The log data is transmitted in, for example, a binary format.

When the data processing apparatus 50 receives the log data from the group management controller 40, the data processing apparatus 50 acquires the run start time included in the log data (step S5). For example, the log data in the binary format is output as a text file, and the run start time is acquired from the output text file. Therefore, it is difficult to falsify the run start time.

Subsequently, the data processing apparatus 50 determines whether or not the application execution start time acquired in step S1 has passed the license expiration date included in the license file stored in the license information storage 56 (step S6). When a result of the determination is that the application execution start time acquired in step S1 has not passed the license expiration date included in the license file stored in the license information storage 56, the processing proceeds to step S7. On the other hand, when the application execution start time acquired in step S1 has passed the license expiration date included in the license file stored in the license information storage 56, the data processing apparatus 50 ends the processing without permitting the execution of the optimization processing.

Subsequently, the data processing apparatus 50 determines whether or not the run start time included in the log data acquired in step S5 has passed the license expiration date included in the license file stored in the license information storage 56 (step S7). When a result of the determination is that the run start time included in the log data acquired in step S5 has not passed the license expiration date included in the license file stored in the license information storage 56, the processing proceeds to step S8. On the other hand, when the run start time included in the log data acquired in step S5 has passed the license expiration date included in the license file stored in the license information storage 56, the data processing apparatus 50 ends the processing without permitting the execution of the optimization processing.

When the run start time included in the log data acquired in step S5 has not passed the license expiration date included in the license file stored in the license information storage 56, the data processing apparatus 50 executes the optimization processing (step S8).

[Action/Effect]

According to the data processing apparatus 50 and the license authentication method of the exemplary embodiment described above, the following effects are exerted.

According to one exemplary embodiment, when at least one of the time at which the instruction to execute the application was received and the run start time included in the log data has passed the license expiration date, the optimization processing may not be executed. Therefore, even when the operator changes the time of the data processing apparatus 50 to a time before the license expiration date, the operator may not execute the optimization processing. As a result, the expiration date of the application may be more securely authenticated.

Further, according to one exemplary embodiment, information on the time included in the log data uses the system time of the semiconductor manufacturing apparatus. Then, since all the time stamps in the semiconductor manufacturing apparatus are changed when the system time is changed, the risk of intentional change is extremely low. Therefore, the expiration date of the application may be more securely authenticated.

In the above-described license authentication method, the case where the optimization processing may not be executed when at least one of the application execution start time and the run start time included in the log data has passed the license expiration time has been described, but the present disclosure is not limited thereto. For example, the optimization processing may also not be executed in a case where the application execution start time is not used and the run start time included in the log data has passed the license expiration date. Also in this case, since all the time stamps in the semiconductor manufacturing apparatus are changed when the system time used for the time included in the log data is changed, the risk of intentional change is extremely low. Therefore, the expiration date of the application may be more securely authenticated.

Further, in the above-described license authentication method, the case where the application execution start time is used has been described, but, instead of the application execution start time, for example, the time of various types of devices connected to the data processing apparatus 50 via a communication line of the semiconductor factory may be used. The various devices may be, for example, the semiconductor manufacturing apparatuses 10, 20 and 30, the group management controller 40, the host computer, and the inspection device.

According to the present disclosure, expiration date authentication may be performed more securely.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A license authentication device comprising:
   a memory configured to store a license file including a license expiration date of an application that adjusts a parameter of a semiconductor manufacturing apparatus in a semiconductor factory; and
   a processor coupled to the memory and configured to:
   acquire log data of the semiconductor manufacturing apparatus when the semiconductor manufacturing apparatus executes a processing;
   determine whether or not a time included in the log data of the semiconductor manufacturing apparatus has passed the license expiration date of the application that is stored in the memory, the time included in the log data using a system time of the semiconductor manufacturing apparatus; and
   when determined that the time included in the log data is before the license expiration date, perform an optimization process in which a target processing condition of the processing of the semiconductor manufacturing apparatus is calculated, based on the log data.

2. The license authentication device according to claim 1, wherein the parameter is adjusted based on the log data in the optimization process.

3. The license authentication device according to claim 2, wherein the time included in the log data is a start time when the semiconductor manufacturing apparatus starts the processing.

4. The license authentication device according to claim 3, wherein the processor is configured to acquire information on a time, and determine whether or not the time in the information has passed the license expiration date of the application that is stored in the memory.

5. The license authentication device according to claim 4, wherein the information on the time includes a time when a device is connected to a communication line of the semiconductor factory.

6. The license authentication device according to claim 5, wherein the device is at least one of the semiconductor manufacturing apparatus, an apparatus that stores the log data, a host computer capable of communicating with the semiconductor manufacturing apparatus, and an inspection device that inspects a semiconductor manufactured by the semiconductor manufacturing apparatus.

7. The license authentication device according to claim 6, wherein the information on the time includes a time of a computer in which the application is installed.

8. The license authentication device according to claim 7, wherein the time of the computer is a current time of the computer.

9. The license authentication device according to claim 7, wherein the time of the computer is a time when the computer starts an execution of the application.

10. The license authentication device according to claim 1, wherein the time included in the log data is a time when the semiconductor manufacturing apparatus starts the processing.

11. The license authentication device according to claim 10, wherein the processor is configured to acquire information on a time, and determine whether or not the time in the information has passed the license expiration date of the application that stored in the memory.

12. The license authentication device according to claim 11, wherein the information on the time includes a time when a device is connected to a communication line of the semiconductor factory.

13. The license authentication device according to claim 12, wherein the device is at least one of the semiconductor manufacturing apparatus, an apparatus that stores the log data, a host computer capable of communicating with the semiconductor manufacturing apparatus, and an inspection device that inspects a semiconductor manufactured by the semiconductor manufacturing apparatus.

14. The license authentication device according to claim 11, wherein the information on the time includes a time of a computer in which the application is installed.

15. The license authentication device according to claim 14, wherein the time of the computer is a current time of the computer.

16. The license authentication device according to claim 14, wherein the time of the computer is a time when the computer starts an execution of the application.

17. A license authentication method comprising:
acquiring log data of a semiconductor manufacturing apparatus when the semiconductor manufacturing apparatus executes a processing;
determining whether or not a time included in the log data of the semiconductor manufacturing apparatus has passed a license expiration date included in a license file of an application that adjusts a parameter of the semiconductor manufacturing apparatus in a semiconductor factory, the time included in the log data using a system time of the semiconductor manufacturing apparatus; and
when determined that the time included in the log data is before the license expiration date, performing an optimization process in which a target processing condition of the processing of the semiconductor manufacturing apparatus is calculated, based on the log data.

* * * * *